United States Patent
Steinmeyer et al.

(10) Patent No.: US 11,645,782 B2
(45) Date of Patent: May 9, 2023

(54) METHOD AND DEVICE FOR CHECKING A CALIBRATION OF ENVIRONMENT SENSORS

(71) Applicant: VOLKSWAGEN AKTIENGESELLSCHAFT, Wolfsburg (DE)

(72) Inventors: Simon Steinmeyer, Braunschweig (DE); Alexander Schwithal, Braunschweig (DE)

(73) Assignee: Volkswagen Aktiengesellschaft

( * ) Notice: Subject to any disclaimer, the term of this patent is extended or adjusted under 35 U.S.C. 154(b) by 370 days.

(21) Appl. No.: 16/945,256

(22) Filed: Jul. 31, 2020

(65) Prior Publication Data
US 2021/0034071 A1 Feb. 4, 2021

(30) Foreign Application Priority Data
Jul. 31, 2019 (DE) ...................... 10 2019 211 459.8

(51) Int. Cl.
*G05D 1/02* (2020.01)
*G06T 7/80* (2017.01)

(52) U.S. Cl.
CPC ...... *G06T 7/80* (2017.01); *G06T 2207/30252* (2013.01)

(58) Field of Classification Search
None
See application file for complete search history.

(56) References Cited

U.S. PATENT DOCUMENTS

| | | | |
|---|---|---|---|
| 8,775,064 | B2 | 7/2014 | Zeng et al. |
| 10,298,910 | B1 | 5/2019 | Kroeger |
| 10,430,970 | B2 | 10/2019 | Bier |
| 10,620,000 | B2 | 4/2020 | Sakano et al. |
| 2007/0182623 | A1 | 8/2007 | Zeng et al. |
| 2017/0061622 | A1 | 3/2017 | Sakano et al. |
| 2020/0143710 | A1 | 5/2020 | Zhou et al. |

FOREIGN PATENT DOCUMENTS

| | | |
|---|---|---|
| CN | 106233711 A | 12/2016 |
| CN | 108141570 A | 6/2018 |
| CN | 109215083 A | 1/2019 |
| CN | 109872370 A | 6/2019 |

(Continued)

*Primary Examiner* — Elmito Breval
(74) *Attorney, Agent, or Firm* — Barnes & Thornburg, LLP

(57) ABSTRACT

A device, transportation vehicle, and method for checking a calibration of surroundings sensors, wherein the surroundings sensors at least partially detect similar surroundings and provide mutually time-synchronized sensor data, periodic features at least for at least one distinguished area are detected in the sensor data of the surroundings sensors belonging to the same surroundings, a transformation of the sensor data corresponding to the at least one distinguished area to a frequency domain is carried out at least for the at least one distinguished area, a frequency and/or a phase angle of the periodic features is determined in the sensor data transformed to the frequency domain, a decalibration of the surroundings sensors is detected based on a comparison of the determined frequencies and/or of the determined phase angles, and a result of the check is provided.

14 Claims, 3 Drawing Sheets

(56) References Cited

FOREIGN PATENT DOCUMENTS

| | | | |
|---|---|---|---|
| DE | 102007005121 A1 | | 9/2007 |
| DE | 102012102769 A1 | | 11/2012 |
| DE | 102014014295 A1 | | 3/2016 |
| DE | 102014226020 A1 | | 6/2016 |
| DE | 102017007765 A1 | | 1/2018 |
| DE | 102017205727 A1 | | 10/2018 |
| DE | 102017222183 A1 | * | 6/2019 |
| EP | 2793045 A1 | | 10/2014 |
| EP | 3001137 A1 | | 3/2016 |
| WO | 2012143036 A1 | | 10/2012 |
| WO | 2015151055 A1 | | 10/2015 |

* cited by examiner

METHOD AND DEVICE FOR CHECKING A CALIBRATION OF ENVIRONMENT SENSORS

PRIORITY CLAIM

This patent application claims priority to German Patent Application No. 10 2019 211 459.8, filed 31 Jul. 2019, the disclosure of which is incorporated herein by reference in its entirety.

SUMMARY

Illustrative embodiments relate to a method and a device for checking a calibration of surroundings sensors.

BRIEF DESCRIPTION OF THE DRAWINGS

Disclosed embodiments are explained in greater detail in the following with reference to the figures. Wherein.

DETAILED DESCRIPTION

Figure 1:
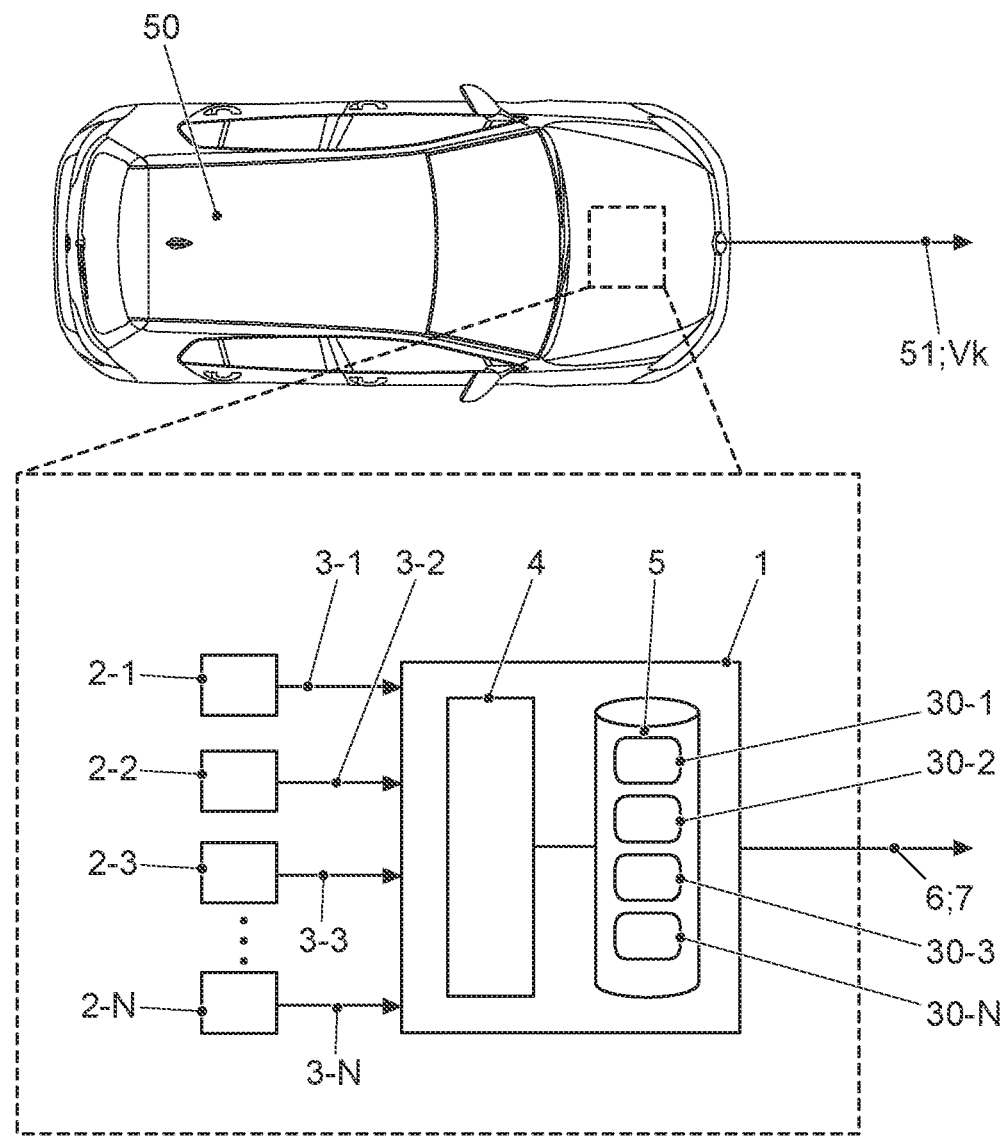
FIG. 1 shows a schematic representation of an exemplary embodiment of the device for checking a calibration of surroundings sensors.

Present and future transportation vehicles are mostly equipped with a plurality of vehicle systems, for example, driver assistance systems and/or safety systems, which evaluate sensor data of a plurality of surroundings-detecting sensors of the transportation vehicle. Driver assistance systems of this type implement functions, which assist the driver in various driving situations. Mentioned by way of example, for this purpose, are avoidance and parking assistants, distance-adaptive controllers for a longitudinal guidance of the transportation vehicle (ACC—adaptive cruise control), transverse guidance systems, such as lane keeping systems or lane-departure warning systems and, in the future, a fully automatic transverse and longitudinal guidance as well. Each of these driver assistance systems and any other vehicle systems is/are dependent on exact sensor data for a correct mode of operation within the scope of the physical uncertainties.

To ensure the required accuracy on the part of the sensors, it is known to calibrate the sensors exactly with respect to the installation position in the transportation vehicle and their detection ranges. This means, extrinsic calibration parameters are detected, which describe the installation position and, therefore, also the detection range, wherein the installation position also encompasses an orientation of the particular sensor. This calibration takes place in general for each sensor during the production of the transportation vehicle.

A problem in this case, however, is that a decalibration of the surroundings sensors with respect to the extrinsic calibration parameters, which are utilized by the evaluation units of the surroundings sensors themselves and/or the evaluation units of the vehicle systems, can occur in the course of the service life of the transportation vehicle due to different influences. These influences include, among other things, geometric changes in a sensor alignment, for example, due to seating properties or accidents, or environmental influences, such as impacts by rocks, condensation, or soiling. As a result, a required accuracy can be lost, whereby any function of a vehicle system, in particular, any driver assistance function, undergoes a degradation of the functionality.

In the case of an object detection in the surroundings of the transportation vehicle carried out on the basis of the gathered sensor data, sensor data of a decalibrated surroundings sensor can result in objects that are detected in the surroundings by multiple surroundings sensors being rendered implausible. In the case of a fusion of sensor data of multiple surroundings sensors as well, a decalibration of even one single surroundings sensor has a negative effect on a quality of the merged sensor data.

DE 10 2014 014 295 A1 makes known a method for monitoring a calibration of multiple sensors, which are installed in the transportation vehicle at an installation position described by extrinsic calibration parameters, with respect to extrinsic calibration parameters. The sensors gather sensor data from the surroundings of a transportation vehicle. To ascertain a decalibration of at least one sensor, sensor data of different surroundings sensors, which describe the same feature of the surroundings in terms of the same property, are evaluated with respect to at least one decalibration criterion comparing the sensor data.

Disclosed embodiments provide an improved method and a device for checking a calibration of surroundings sensors.

A method for checking a calibration of surroundings sensors is made available, wherein the surroundings sensors at least partially detect similar surroundings and each provide mutually time-synchronized sensor data, wherein periodic features at least for at least one distinguished area are detected in the sensor data of the surroundings sensors belonging to the same surroundings, wherein a transformation of the sensor data corresponding to the at least one distinguished area to a frequency domain is carried out at least for the at least one distinguished area, wherein, in each case, a frequency and/or a phase angle of the periodic features is determined in the particular sensor data transformed to the frequency domain, wherein a decalibration of the surroundings sensors is detected on the basis of a comparison of the particular determined frequencies and/or of the particular determined phase angles, and wherein a result of the check is provided.

Moreover, a device for checking a calibration of surroundings sensors is created, wherein the surroundings sensors at least partially detect similar surroundings and each provide mutually time-synchronized sensor data, comprising a control unit, wherein the control unit is designed for receiving sensor data of the surroundings sensors, detecting periodic features at least for at least one distinguished area in the sensor data of the surroundings sensors belonging to the same surroundings, carrying out a transformation, in each case, of the sensor data corresponding to the at least one distinguished area to a frequency domain at least for the at least one distinguished area, determining, in each case, a frequency and/or a phase angle of the periodic features in the particular sensor data transformed to the frequency domain, and detecting a decalibration of the surroundings sensors on the basis of a comparison of the particular determined frequencies and/or of the particular determined phase angles, and providing a result of the check.

The method and the device make it possible to check a calibration of the surroundings sensors in an improved way. This takes place in that spatially periodic features are detected in the surroundings at least in at least one distinguished area. Spatially periodic features can be, for example, posts of guardrails, dashed markings in the center of a roadway, or a crosswalk. Sensor data are evaluated to detect the spatially periodic features. In this case, the periodic features are sought and detected in the portions of the surroundings that are detected by all surroundings sensors to be checked. The particular sensor data belonging to the at least one distinguished area of the surroundings and/or to the detected periodic features are subsequently transformed to a frequency domain, in particular, with the aid of a Fourier transform or a fast Fourier transform (FFT). In this case, a transformation from a space domain to a frequency domain takes place. Alternatively, a transformation from a time domain to a frequency domain can also be carried out. In this case, the location-dependent sensor data are transformed to or depicted onto a time base in advance. Starting from the (Fourier-) transformed sensor data, a frequency and/or a phase angle of the periodic features is/are determined in each case (for each of the surroundings sensors). A decalibration of the surroundings sensors is then detected on the basis of a comparison of the particular determined frequencies and/or of the particular determined phase angles. The disclosed embodiments are based on the finding, in this case, that surroundings sensors, in the case of a decalibration, detect spatially periodic features in the surroundings with a different (spatial) frequency and/or phase angle, for example, because an alignment of the surroundings sensors with respect to one another is different after the decalibration. The disclosed embodiments make use of this difference, in that a decalibration is detected on the basis of a comparison of the particular determined frequencies and/or the determined phase angles. If, for example, a crosswalk has been detected by a camera and by a LIDAR sensor, which are both decalibrated with respect to one another and which, for example, have a different alignment, the camera detects the periodic features of the crosswalk on the basis of the different alignment and/or a different alignment angle with a period other than that of the LIDAR sensor. Due to the different periods of the detected crosswalk, a frequency and/or a phase angle in the gathered sensor data are/is different. A decalibration can therefore be detected via a comparison of the determined frequencies and/or phase angles.

Surroundings sensors can be, for example, the following sensors: a camera, a laser scanner or a light detection and ranging (LIDAR) sensor, a radar sensor, and/or an ultrasonic sensor. Sensor data depict the detected surroundings, in particular, two- or three-dimensionally, for example, as two- or three-dimensional camera images or as three-dimensional point clouds. A measuring variable in the sensor data, which is utilized within the scope of the method, is or can be selected, in particular, in a sensor-independent manner. If a surroundings sensor is a camera, a measuring variable, which is utilized for detecting the periodic feature in the sensor data, can be, for example, a color value or a brightness value in the detected camera images. In the case of a LIDAR sensor, for example, a depth value or a reflectance is utilized as the measuring variable.

The sensor data are present, in particular, in a two- or three-dimensional form with respect to a location. The sensor data of the surroundings sensors are time-synchronized, so that it can be ensured that the comparison of the frequencies and/or phase angles takes place on the basis of simultaneously detected periodic features. Within the scope of the time synchronization, it can be provided that sensor data are interpolated, for example, to adapt a time base with respect to one another. In other words, the sensor data are to comprise, the same section of the surroundings.

The detection of the periodic features can take place, for example, with the aid of methods of machine learning and computer vision. It can also be provided that, for example, a database is maintained, in which suitable periodic features are stored. For example, suitable periodic features can be stored in a surroundings map and can be queried and selected in a position-dependent manner as necessary.

A distinguished area is an area or a portion of the surroundings detected by the surroundings sensors, in which periodic features are to be found. A portion and/or a selection of the gathered sensor data of each of the surroundings sensors correspond(s) to the distinguished area in each case.

Periodic features are properties of one or multiple objects, which result in a feature or multiple features of the object or the objects repeating at regular intervals. Examples for periodic features are posts of a guardrail, roadway markings, fence posts, stripes of a crosswalk, parking space markings, paving stones, ceiling or wall lighting in tunnels, etc.

The decalibration is detected with respect to extrinsic calibration parameters. A position and an alignment of a surroundings sensor relative to a reference object are referred to as extrinsic calibration parameters. This reference object can be a transportation vehicle. The extrinsic calibration parameters are based, in this case, on the same coordinate system for all surroundings sensors.

Upon detection of the decalibration, a decalibration of the surroundings sensors with respect to one another is detected. On the other hand, an absolute decalibration cannot be determined, i.e., when all the multiple surroundings sensors are decalibrated in the same way with respect to the extrinsic calibration parameters, this cannot be detected with the aid of the method. According to the disclosed embodiments, however, it is more likely to assume that, when there are multiple surroundings sensors, the case occurs that one or only a few of the surroundings sensor(s) is/are decalibrated.

It can be provided that the surroundings sensors are moved jointly at one speed. The common speed defines a velocity vector. The speed at which the surroundings sensors are jointly moved is a speed of a transportation vehicle, on or at which the surroundings sensors are arranged.

The method is carried out with the aid of a control unit. The control unit can be designed as a combination of hardware and software, for example, as program code, which is run on a microcontroller or microprocessor. The control unit comprises a memory unit or can access a memory unit. The computing unit for carrying out the method can carry out arithmetic operations in the memory unit.

The transformation takes place from a space domain to a frequency domain, i.e., spatial frequencies occurring in the at least one distinguished area are represented in the frequency domain.

The at least one distinguished area is rectangular and extends along and/or in parallel to a velocity vector corresponding to the common speed of the surroundings sensors. If the surroundings sensors are arranged at or in a transportation vehicle, this means that an alignment of the distinguished area, such as a detection strip, ideally lies along a travel direction and/or a velocity vector of the transportation vehicle.

It can be provided that a frequency filtering at least of the sensor data corresponding to the periodic features and/or of the sensor data corresponding to the at least one distinguished area is carried out before the comparison is carried out. For example, a bandpass filtering about a frequency expected for the periodic features can take place. As a result, other frequencies, which also occur in the sensor data, can be filtered out. This simplifies and improves the subsequent comparison of the frequencies and/or of the phase angles.

In at least one disclosed embodiment, it is provided that a decalibration is detected when a frequency difference between the determined frequencies exceeds a predefined frequency threshold value and/or when a phase difference between the determined phase angles exceeds a predefined phase threshold value. As a result, the detection of the decalibration can take place in a particularly simple way. For example, it can be provided that a decalibration is detected when at least one of the differences determined for the surroundings sensors exceeds the frequency threshold value and/or the phase threshold value. It can also be provided, in this case, that a frequency threshold value and/or a phase threshold value is/are selected and/or predefined depending on the particular surroundings sensor. As a result, sensor-specific properties can be taken into account.

In at least one disclosed embodiment, it is provided that the sensor data of the surroundings sensors are projected into an image space onto a velocity vector corresponding to a speed, wherein the transformation into the frequency domain takes place on the basis of the projected sensor data. As a result, a high accuracy can be achieved during the detection of a decalibration. For example, a detected camera image of a camera operating as a surroundings sensor can be used as the basis for a (perspective) projection. With known imaging properties of the camera, a velocity vector corresponding to the speed can be perspectively projected into the image space of the camera image. This takes place in the distinguished area. The sensor data corresponding to the periodic features are then projected onto the velocity vector, which has been projected in this way. Since this takes place for all sensor data and the subsequent comparison takes place on the basis of the sensor data projected onto the velocity vector, the comparison can take place after the transformation to the frequency domain in a particularly simple way.

In at least one disclosed embodiment, it is provided that the method is started when periodic features at least in the at least one distinguished area are detected or have been detected in the sensor data at least of one of the surroundings sensors. As a result, a computing power of the control unit can be conserved and/or temporarily reduced, since this is needed only when the method is also implementable, i.e., when suitable periodic features (for example, a guardrail including periodic posts, crosswalks, periodic roadway markings) are present in the surroundings and/or in the gathered sensor data.

In at least one disclosed embodiment, it is provided that at least one of the surroundings sensors is a camera, wherein the camera provides camera images as sensor data, and wherein a semantic segmentation of the camera images takes place, wherein the at least one distinguished area is recognized and detected on the basis of the semantic segmentation. As a result, known methods of machine learning and/or computer vision can be utilized in a beneficial way.

It can be provided that, alternatively or additionally, the at least one distinguished area can be ascertained and detected on the basis of a surroundings map stored in a memory unit. In the stored surroundings map, for example, periodic features can be stored, which are identified starting from, for example, a present position of the surroundings sensors, and are retrieved from the surroundings map.

Further features of the exemplary embodiments of the disclosed device result from the description of exemplary embodiments of the disclosed method. The benefits of the disclosed device are the same, in each case, as for the exemplary embodiments of the disclosed method.

Moreover, a transportation vehicle is also created, comprising surroundings sensors and at least one disclosed device.

In FIG. 1, a schematic representation of at least one disclosed embodiment of the device 1 for checking a calibration of surroundings sensors 2-$x$ is shown. The device 1 and the surroundings sensors 2-$x$ are arranged in a transportation vehicle 50, which moves at a speed along a speed vector Vk in a travel direction 51. The surroundings sensors 2-$x$ detect, for example, surroundings situated ahead of the transportation vehicle 50, wherein all surroundings sensors at least partially detect the same surroundings. The surroundings sensors 2-$x$ provide time-synchronized sensor data 3-$x$.

The device 1 comprises a control unit 4 and a memory unit 5, wherein the control unit 4 can access the memory unit 5 and can carry out arithmetic operations in the memory unit 5 to carry out the method.

The control unit 4 receives the sensor data 3-$x$ of the surroundings sensors 2-$x$. The control unit 4 detects periodic features, for example, periodic arrangements of posts of a guardrail or of stripes of a crosswalk (cf. FIG. 2$a$), at least for at least one distinguished area, in the sensor data 3-$x$ of the surroundings sensors 2-$x$ belonging to the same surroundings.

The control unit 4 carries out a transformation to the frequency domain, at least for the at least one distinguished area, on sensor data 3-$x$ corresponding to the at least one distinguished area, in particular, in that a Fourier transform or a fast Fourier transform is carried out on the particular sensor data 3-$x$ corresponding to the at least one distinguished area, so that, thereafter, transformed sensor data 30-$x$ are present.

After the transformation has taken place, the control unit 4 determines a frequency and/or a phase angle of the periodic features in each case, in the particular sensor data 30-$x$ transformed to the frequency domain.

The control unit 4 detects a decalibration of the surroundings sensors 2-$x$ on the basis of a comparison of the particular determined frequencies and/or of the particular determined phase angles.

In particular, it is provided that a decalibration is detected when a frequency difference between the determined frequencies exceeds a predefined frequency threshold value and/or when a phase difference between the determined phase angles exceeds a predefined phase threshold value.

Thereafter, the control unit 4 provides a result of the check 6, for example, as a check-result signal 7, which is provided as a digital data packet.

It can be provided that the control unit 4 projects the sensor data 3-$x$ of the surroundings sensors 2-$x$ into an image space onto a velocity vector corresponding to the speed, wherein the transformation to the frequency domain takes place on the basis of the projected sensor data.

Moreover, it can be provided that the method is started when periodic features at least in the at least one distinguished area are detected or have been detected in the sensor data 3-$x$ of at least of one of the surroundings sensors 2-$x$.

Moreover, it can be provided that at least one of the surroundings sensors 2-*x* is a camera, wherein the camera provides camera images as sensor data 3-*x*, and wherein a semantic segmentation of the camera images takes place, wherein the at least one distinguished area is recognized and detected on the basis of the semantic segmentation.

Figure 2A:
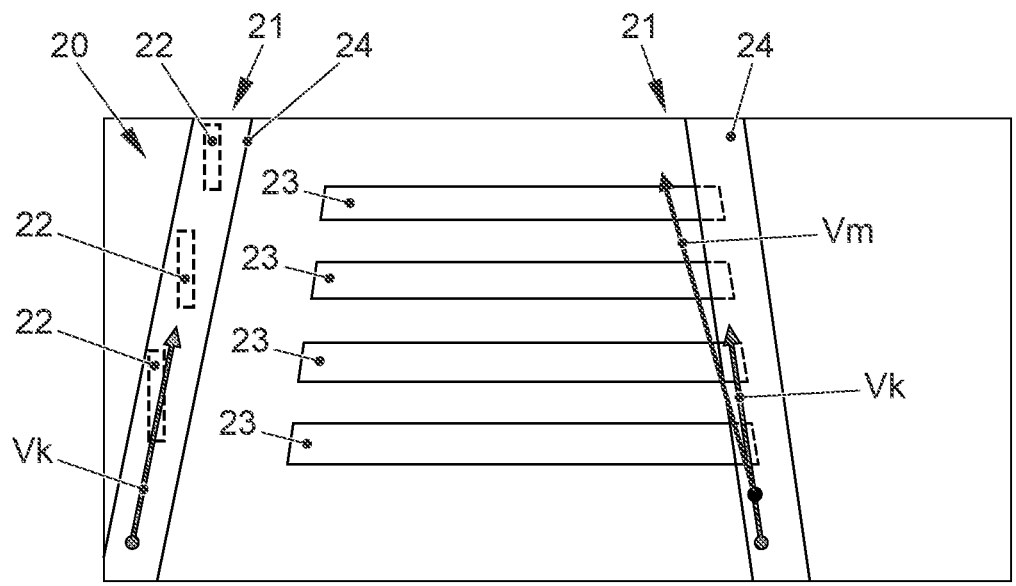
FIG. 2a shows a schematic representation for illustrating an exemplary embodiment of the method based on an example for two surroundings sensors.

In FIG. 2*a*, a schematic representation is shown for illustrating at least one disclosed embodiment of the method for two surroundings sensors. The two surroundings sensors are, for example, a camera and a LIDAR sensor. With respect to the camera, spatially resolved brightness values and/or color values are provided as sensor data; with respect to the LIDAR sensor, spatially resolved reflectance values are provided.

FIG. 2*a* shows surroundings 20, in which periodic features 21 are present, for example, posts 22 of a guardrail on the left side and stripes 23 of a crosswalk on the right side. Moreover, two distinguished areas 24 are schematically shown. The left distinguished area 24 comprises the posts 22 of the guardrail, the right distinguished area 24 comprises the right outer area of the stripes 23 of the crosswalk. Sensor data 3-1, 3-2 corresponding to the distinguished areas 24 are considered in the following.

Figure 2B:
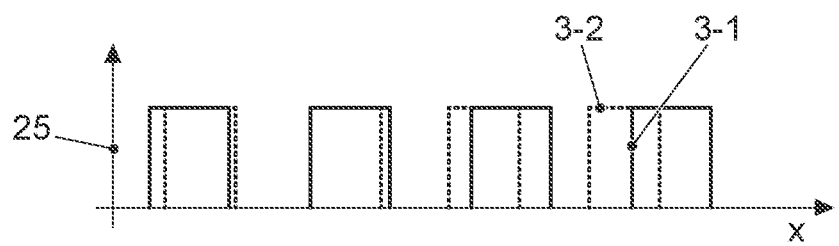
FIG. 2b shows a schematic representation of gathered sensor data of the two surroundings sensors.

In a calibrated state, the surroundings sensors are aligned in the direction of a velocity vector Vk. Due to a decalibration of one of the two surroundings sensors, which is illustrated with the aid of a detection vector Vm, which is oriented differently than the velocity vector Vk, the decalibrated surroundings sensor detects the surroundings from or in another direction, however. As a result, the periodic features 21 are locally and/or spatially detected by the two surroundings sensors with a different period in each case. The particular sensor data 3-1, 3-2 gathered by the two sensors for the right distinguished area 24 are shown in FIG. 2*b* as amplitudes 25 as a function of a position coordinate x. In the calibrated state, the square wave signals would have to be situated one above the other. Due to the decalibration of one of the two surroundings sensors, the sensor data 3-1 of the one surroundings sensor are shifted, however, with respect to the sensor data 3-2 of the other surroundings sensor relative to the position coordinate x.

Figure 2C:
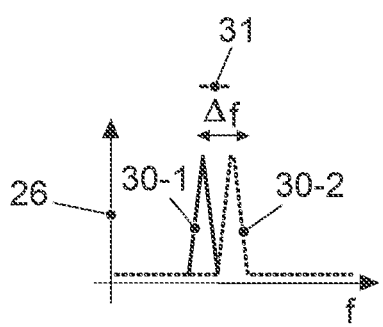
FIG. 2c shows a schematic representation of the transformed sensor data (frequency spectrum)
Figure 2D:
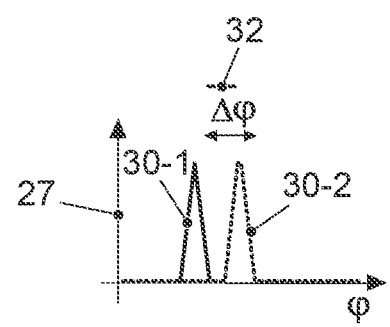
FIG. 2d shows a schematic representation of the transformed sensor data (phase spectrum)

The sensor data 3-1, 3-2 of the two surroundings sensors are subjected to a Fourier transform, in particular, a fast Fourier transform. The result of the transformation from the space domain to the frequency domain is represented in FIGS. 2*c* and 2*d*. In FIG. 2*c*, a frequency spectrum, i.e., a power 26 (or an amplitude) of the Fourier-transformed sensor data 30-1, 30-2, is represented as a function of a the frequency f. In FIG. 2*d*, a power 26 (or an amplitude) of the Fourier-transformed sensor data 30-1, 30-2, is represented as a function of a the phase y.

In FIG. 2*c*, it is clearly apparent on the basis of the transformed sensor data 30-1, 30-1 that the sensor data 3-1, 3-2 have a different frequency f, i.e., are situated apart from one another with respect to a frequency f by a frequency difference $\Delta f$, although the periodic features 21 causing this, namely the stripes 23 of the crosswalk in the right distinguished area 24, are the same.

In FIG. 2*d*, it is also clearly apparent on the basis of the transformed sensor data 30-1, 30-1 that the sensor data 3-1, 3-2 have a different phase angle, i.e., are situated apart from one another with respect to a phase y by a phase difference $\Delta \varphi$, although the periodic features 21 causing this, namely the stripes 23 of the crosswalk in the right distinguished area 24, are the same.

The frequency difference $\Delta f$ and/or the phase difference $\Delta \varphi$ are/is compared to a frequency threshold value 31 and a phase threshold value 32, respectively. If the frequency threshold value 31 and/or the phase threshold value 32 are/is exceeded, a decalibration of the two surroundings sensors is detected and a corresponding result of the check is provided.

If further surroundings sensors are present, the sensor data associated with the right distinguished area 24 are correspondingly compared to one another in pairs in each case. A decalibration can be detected when sensor data 3-1, 3-2 at least of one of the surroundings sensors exceed the frequency threshold value 31 and/or the phase threshold value 32.

Figure 3:
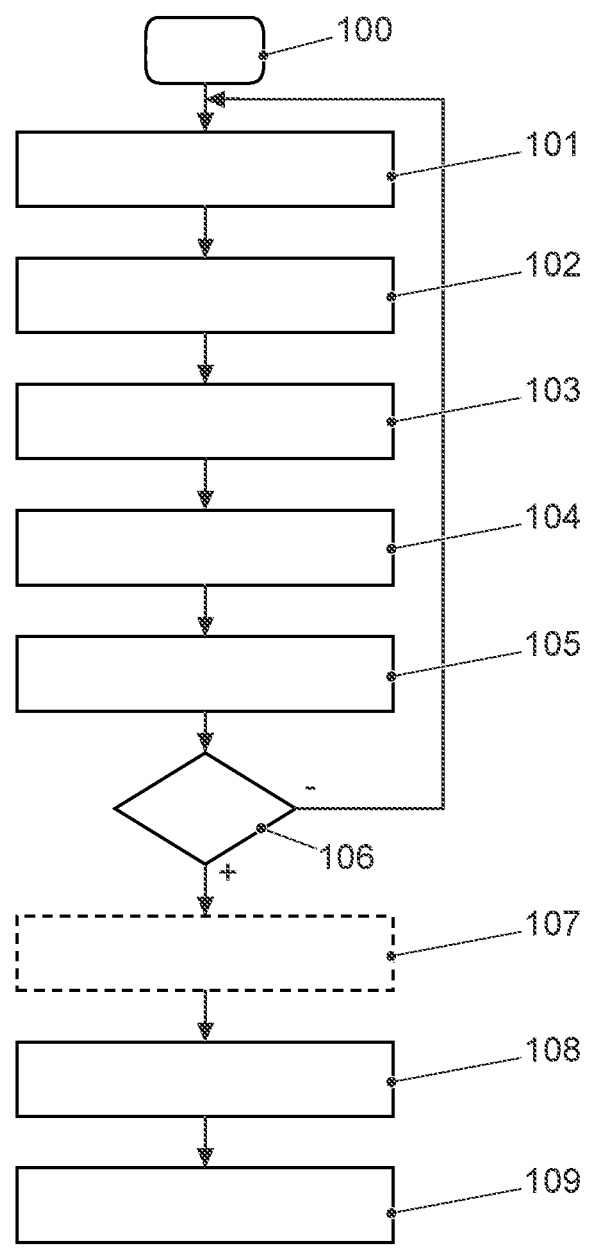
FIG. 3 shows a schematic flow chart of an exemplary embodiment of the method.

In FIG. 3, a schematic flow chart of at least one disclosed embodiment of the method is shown. The method is carried out in the transportation vehicle, for example, for multiple surroundings sensors of a transportation vehicle. The method is started, for example, with the aid of a method operation at 100, when a start condition has been met. Such a start condition can be, for example, the presence or detection of suitable periodic features (for example, stripes of a crosswalk, etc.) in gathered sensor data, for example, in camera images captured with the aid of a camera. Alternatively, the method can also be carried out continuously, for example, for a fixedly predefined distinguished area; the method is then started, for example, upon a start of a transportation vehicle.

In a method operation at 101, sensor data of the surroundings sensors are gathered. If the gathered sensor data are not time-synchronized or if the gathered sensor data have different time bases, a time synchronization takes place in a method operation at 102. The time synchronization can encompass an interpolation of the sensor data.

In a method operation at 103, a velocity vector of the transportation vehicle is transformed via a perspective image under consideration of particular imaging conditions of the surroundings sensors into the particular coordinate systems of the surroundings sensors (for example, into an image coordinate system of the camera in the case of a camera as a surroundings sensor).

In a method operation at 104, sensor data of the surroundings sensors corresponding to the distinguished areas, in which periodic features are to be found, are extracted. This takes place in that the sensor data, which are located in a projection on the velocity vectors projected into the coordinate systems of the surroundings sensors in each case, are extracted.

The extracted sensor data are transformed to a frequency domain in a method operation at 105. This takes place from a space domain. It can also be provided, however, that the extracted sensor data are transformed to or mapped onto a time base in advance, so that a transformation from a time domain to a frequency domain takes place. The transformation takes place with the aid of a Fourier transform, in particular, with the aid of a discrete fast Fourier transform.

In a method operation at 106, a check is carried out to determine whether a frequency in the transformed sensor data can be reliably detected in the frequency domain. This can also take place for the phase angle. If a frequency and/or a phase angle cannot be reliably determined, the method operation at 101 is returned to again.

In a method operation at 107, it can be provided that a frequency filtering is carried out, for example, a bandpass filtering, to filter out undesirable frequencies and facilitate a signal processing of a signal generated by the periodic features.

If a frequency and/or a phase angle can be reliably determined, a comparison between the frequencies and/or phase angles of the sensor data of the surroundings sensors takes place in a method operation at 108. Frequency differences and/or phase differences are determined, in pairs in each case, for the surroundings sensors, and are compared to a frequency threshold value or a phase threshold value, respectively. If a difference exceeds the associated threshold value, a decalibration is detected.

In a method operation at 109, a result of the check is provided and output, for example, as a check-result signal, such as a digital data packet.

LIST OF REFERENCE NUMBERS

1 device
2-*x* surroundings sensor
3-*x* sensor data
4 control unit
5 memory unit
6 result of the check
7 check-result signal
20 surroundings
21 periodic features
22 posts
23 stripe
24 distinguished area
30-*x* transformed sensor data
31 frequency threshold value
32 phase threshold value
50 transportation vehicle
51 travel direction
100-109 method operations
Vk velocity vector
Vm detection vector
f frequency
Δf frequency difference
φ phase (angle)
Δφ phase difference

The invention claimed is:

1. A device for checking a calibration of surroundings sensors, wherein the surroundings sensors at least partially detect similar surroundings and each provide mutually time-synchronized sensor data, the device comprising:
a control unit;
wherein the control unit receives sensor data of the surroundings sensors, detecting periodic features at least for at least one distinguished area in the sensor data of the surroundings sensors belonging to the same surroundings, carrying out a transformation of the sensor data corresponding to the at least one distinguished area to a frequency domain at least for the at least one distinguished area, determining a frequency and/or a phase angle of the periodic features transformed to the frequency domain, and detecting a decalibration of the surroundings sensors based on a comparison of the determined frequencies and/or of the determined phase angles, and providing a result of the check.

2. The device of claim 1, wherein the control unit further detects a decalibration in response to a frequency difference between the determined frequencies exceeding a predefined frequency threshold value and/or a phase difference between the determined phase angles exceeding a predefined phase threshold value.

3. The device of claim 1, wherein the control unit further projects the sensor data of the surroundings sensors into an image space onto a velocity vector corresponding to a speed, and carries out the transformation to the frequency domain based on the projected sensor data.

4. The device of claim 1, wherein the control unit further initiates the carrying out of the transformation of the sensor data and determining the frequency and/or the phase angle when periodic features at least in the at least one distinguished area are detected in the sensor data at least of one of the surroundings sensors.

5. A transportation vehicle, comprising:
surroundings sensors; and
at least one device according to claim 1.

6. The device of claim 1, wherein a plurality of the same periodic features are detected by each of the surroundings sensors.

7. The device of claim 1, wherein the periodic features are properties of one or multiple objects that spatially repeat at regular intervals.

8. A method for checking a calibration of surroundings sensors,
wherein the surroundings sensors at least partially detect similar surroundings and each provide mutually time-synchronized sensor data;
wherein periodic features at least for at least one distinguished area are detected in the sensor data of the surroundings sensors belonging to the same surroundings;
wherein a transformation of the sensor data corresponding to the at least one distinguished area to a frequency domain is carried out at least for the at least one distinguished area;
wherein a frequency and/or a phase angle of the periodic features is determined in the sensor data transformed to the frequency domain;
wherein a decalibration of the surroundings sensors is detected based on a comparison of the determined frequencies and/or of the determined phase angles; and
wherein a result of the check is provided.

9. The method of claim 8, wherein a decalibration is detected when a frequency difference between the determined frequencies exceeds a predefined frequency threshold value and/or when a phase difference between the determined phase angles exceeds a predefined phase threshold value.

10. The method of claim 8, wherein the sensor data of the surroundings sensors are projected into an image space onto a velocity vector corresponding to a speed, wherein the transformation to the frequency domain takes place based on the projected sensor data.

11. The method of claim 8, wherein the method begins when periodic features at least in the at least one distinguished area are detected in the sensor data of at least of one of the surroundings sensors.

12. The method of claim 8, wherein at least one of the surroundings sensors is a camera, wherein the camera provides camera images as sensor data, and wherein a semantic segmentation of the camera images takes place, wherein the at least one distinguished area is recognized and detected based on the semantic segmentation.

13. The method of claim 8, wherein a plurality of the same periodic features are detected by each of the surroundings sensors.

14. The method of claim 8, wherein the periodic features are properties of one or multiple objects that spatially repeat at regular intervals.

* * * * *